March 25, 1924.　　　　　　　　　　　　　　　1,487,947
J. JONES
LINE ATTACHING DEVICE FOR TRANSMISSION BANDS
Filed March 28, 1923

Inventor,
J. Jones.
By Ashron Lee.
Attorneys

Patented Mar. 25, 1924.

1,487,947

UNITED STATES PATENT OFFICE.

JENKIN JONES, OF NEWARK, OHIO.

LINE-ATTACHING DEVICE FOR TRANSMISSION BANDS.

Application filed March 28, 1923. Serial No. 628,308.

*To all whom it may concern:*

Be it known that I, JENKIN JONES, a citizen of the United States, residing at Newark, in the county of Licking and State of Ohio, have invented a new and useful Line-Attaching Device for Transmission Bands, of which the following is a specification.

This invention relates to transmission bands for automobiles and more particularly to those used on Ford cars.

The object of the invention is to provide a lining attaching device for bands of this character, whereby a full floating lining may be provided which prolongs the life thereof and which affords quick and easy replacement of the lining.

Another object is to provide a device of this character which prevents the lining from creeping sideways or endways without the use of rivets except at the ends, and which also dispenses with the use of pins, keys, or the like.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
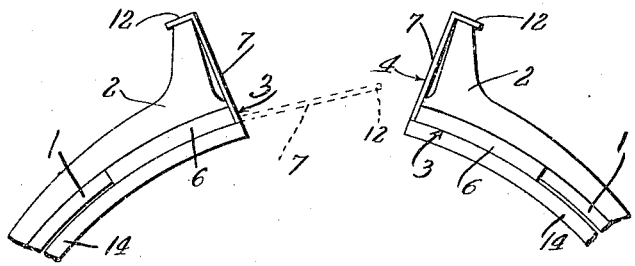
Figure 1 represents a side elevation of the ends of the transmission band with this improved attachment in operative position thereon.
Figure 2:
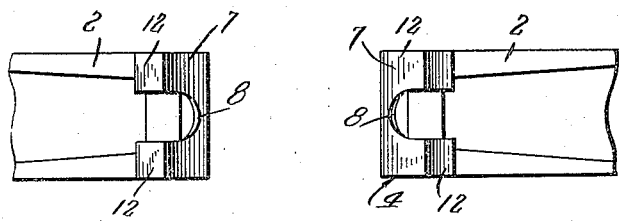
Fig. 2 is a top plan view thereof.
Figure 3:
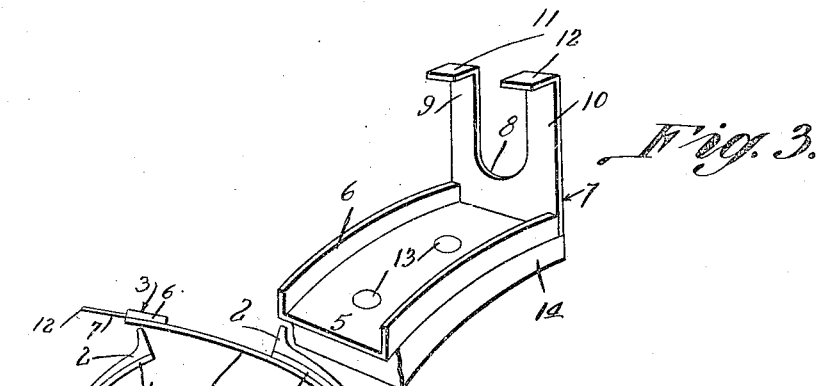
Fig. 3 is a detail perspective view of one of the lining attaching brackets.
Figure 4:
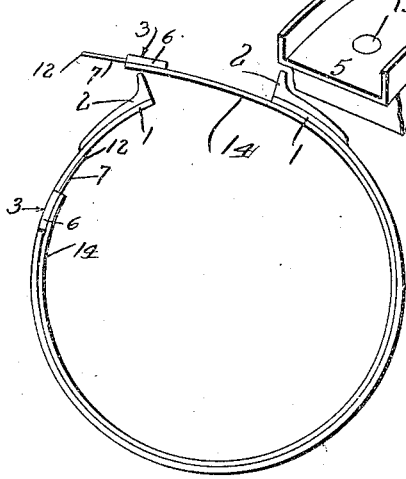
Fig. 4 is a side elevation of a transmission band with this improved lining attachment shown in use and the lining partially withdrawn.

In the embodiment illustrated, a transmission band 1 is shown such as is ordinarily used on Ford cars and which is provided at the ends with laterally and outwardly extending apertured lugs 2 for the passage of the connecting and tightening bolt (not shown).

The lining attaching device comprises two brackets 3 and 4 which are exactly alike in construction, and hence one only will be described in detail. The bracket 3 which is employed at the left of the brake band is composed of a plate 5 of a width corresponding to the width of the band 1, and which is equipped with side flanges 6 designed to fit against the edges of the band 1, which will operate to hold the bracket against lateral movement relative to the band. An end plate 7 extends outwardly at right angles to the plate 5 and has a recess 8 dividing it into bifurcations 9 and 10, which are equipped at their outer ends with inwardly and laterally extending fingers 11 and 12 designed to fit over the upper edge of the lug 2 to hold the bracket assembled on the band and prevent its radial movement. The recess 8 in the end plate 7 is designed to register with the bolt openings in the lugs 2 to permit the bolts to pass freely through them.

The plate 5 is provided with a plurality of longitudinally spaced apertures 13 whereby the bracket is riveted to one end of the lining 14.

The brackets 3 and 4 are riveted to the ends of the lining 14 and are engaged with the band 1 as shown in Fig. 1, said brackets being hooked over the lugs 2 and holding the lining closely assembled on the band, thus providing a full floating lining having no rivets throughout the major portion of its length so that when it is desired to remove the lining, all that is necessary is to straighten out one of the ends 7 and draw the lining out as shown in Fig. 1, and then replace it with another, thus enabling a band to be quickly and easily relined.

Various changes in the form, shape, proportion and other minor details of construction may be made within the scope of what is claimed without departing from the principle or sacrificing any of the advantages of the claimed invention.

I claim:—

1. A transmission band lining having attaching brackets at the ends thereof, said brackets being equipped with side flanges to prevent lateral creeping of the lining relatively to the band.

2. A transmission band lining having brackets at the ends thereof each of said brackets comprising a lining engaging plate having side flanges and provided at one end with a right angular member recessed to straddle the connecting bolt, and provided with means to hold it engaged with the band.

3. A transmission band lining having brackets at the ends thereof each of said brackets comprising a lining engaging plate having side flanges and provided at one end with a right angular member recessed to straddle the connecting bolt, and provided with lateral fingers positioned to engage the outer ends of the band lugs to assist in holding the device assembled.

In testimony that I claim the foregoing as my own, I have hereto affixed my signature in the presence of two witnesses.

JENKIN JONES.

Witnesses:
 EDITH SMITH,
 CARL W. DUNCAN.